(12) United States Patent
LeGrand (10) Patent No.: US 8,539,207 B1
(45) Date of Patent: Sep. 17, 2013

(54) LATTICE-BASED COMPUTATIONS ON A PARALLEL PROCESSOR

(75) Inventor: Scott M. LeGrand, Soquel, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1265 days.

(21) Appl. No.: 11/556,683

(22) Filed: Nov. 3, 2006

(51) Int. Cl.
 *G06F 9/44* (2006.01)
(52) U.S. Cl.
 USPC .......................................................... 712/225
(58) Field of Classification Search
 USPC .......................................................... 712/225
 See application file for complete search history.

(56) References Cited

U.S. PATENT DOCUMENTS

| | | | |
|---|---|---|---|
| 6,269,185 B1 * | 7/2001 | Takai | 382/167 |
| 2006/0095712 A1 * | 5/2006 | Selvaggi et al. | 712/22 |

OTHER PUBLICATIONS

Patterson, David. Hennessy, John. Computer Architecture: A Quantitative Approach. Morgan Kaufmann Publishers, Inc. Second Edition, 1996. pp. 38-41, 373-383, 416-433, and 635-647.*

* cited by examiner

*Primary Examiner* — Robert Fennema
(74) *Attorney, Agent, or Firm* — Kilpatrick Townsend & Stockton LLP (57) ABSTRACT

Circuits, methods, and apparatus that reduce the amount of data read from an external memory by a processor when performing calculations on data sets such as matrices or lattices. In one example, a computation algorithm is executed by threads running on a parallel processor such as a single-instruction, multiple-data processor, which stores computational data in on chip memories. Data to be processed by a group of threads is read from the external memory and stored in a first on-chip memory, while a copy of data to be processed at a later time by the group of threads is stored in a second on-chip memory. Data in the first on-chip memory is processed multiple times before being written to the external memory. Processing data multiple times and keeping a copy of data for later use reduces the amount of data to be retrieved from memory, thereby improving computational efficiency.

20 Claims, 11 Drawing Sheets

Figure 6A — Set of data 610 read from Global Memory, stored in Global Register Files, subset 620 stored in Local Register Files.

$a_{11}, a_{12}, a_{13}, a_{14}, a_{15}$
$a_{21}, a_{22}, a_{23}, a_{24}, a_{25}$
$a_{31}, a_{32}, a_{33}, a_{34}, a_{35}$
$a_{41}, a_{42}, a_{43}, a_{44}, a_{45}$

600 — full array; 610 — subset (columns 1–4); 620 — subset (columns 2–4).

Figure 6B — Array data 610 processed by CTA. Results stored in Global Memory.

$a_{11}, a_{12}, a_{13}, a_{14}, a_{15}$
$a_{21}, a_{22}, a_{23}, a_{24}, a_{25}$
$a_{31}, a_{32}, a_{33}, a_{34}, a_{35}$
$a_{41}, a_{42}, a_{43}, a_{44}, a_{45}$

610

Figure 6C — Data 620 read from local register files.

$a_{11}, a_{12}, a_{13}, a_{14}, a_{15}$
$a_{21}, a_{22}, a_{23}, a_{24}, a_{25}$
$a_{31}, a_{32}, a_{33}, a_{34}, a_{35}$
$a_{41}, a_{42}, a_{43}, a_{44}, a_{45}$

620

Figure 6D — Data 630 read from Global Memory. Data 620 and 630 processed by CTA.

$a_{11}, a_{12}, a_{13}, a_{14}, a_{15}$
$a_{21}, a_{22}, a_{23}, a_{24}, a_{25}$
$a_{31}, a_{32}, a_{33}, a_{34}, a_{35}$
$a_{41}, a_{42}, a_{43}, a_{44}, a_{45}$

620, 630

| 200 | 210 | 220 | 230 | 240 | 250 | 260 | 270 |
|---|---|---|---|---|---|---|---|
| 201 | 100 | 110 | 120 | 130 | 140 | 150 | 271 |
| 202 | 101 | 00 | 10 | 20 | 30 | 151 | 272 |
| 203 | 102 | 01 | 11 | 21 | 31 | 152 | 273 |
| 204 | 103 | 02 | 12 | 22 | 32 | 153 | 274 |
| 205 | 104 | 03 | 13 | 23 | 33 | 154 | 275 |
| 206 | 105 | 115 | 125 | 135 | 145 | 155 | 276 |
| 207 | 217 | 227 | 237 | 247 | 257 | 267 | 277 |

Figure 7

|     |     |     |     |     |     |     |     |     |     |     |     |     |     |     |     |
| --- | --- | --- | --- | --- | --- | --- | --- | --- | --- | --- | --- | --- | --- | --- | --- |
| 200 | 210 | 220 | 230 | 240 | 250 | 260 | 270 | N270 |
| 201 | 100 | 110 | 120 | 130 | 140 | 150 | 271 | N271 |
| 202 | 101 | 00  | 10  | 20  | 30  | 151 | 272 | N260 | N150 | N30 | N20 | N130 | N240 | N250 | N272 |
| 203 | 102 | 01  | 11  | 21  | 31  | 152 | 273 | | | N31 | N21 | | | | N273 |
| 204 | 103 | 02  | 12  | 22  | 32  | 153 | 274 | | | N32 | N22 | | | | N274 |
| 205 | 104 | 03  | 13  | 23  | 33  | 154 | 275 | | | N33 | N23 | | | | N275 |
| 206 | 105 | 115 | 125 | 135 | 145 | 155 | 276 | N267 | N155 | N145 | N135 | N247 | N257 | N276 |
| 207 | 217 | 227 | 237 | 247 | 257 | 267 | 277 | N277 |

Figure 8

LATTICE-BASED COMPUTATIONS ON A PARALLEL PROCESSOR

BACKGROUND

The present invention relates generally to graphics processors and more particularly to executing particular types of computational algorithms using graphics processors.

The demand for increased realism in computer graphics for games and other applications has been steady for some time now and shows no signs of abating. This has placed stringent performance requirements on computer system components, particularly graphics processors. For example, to generate improved images, an ever increasing amount of data needs to be processed by a graphics processing unit. In fact, so much graphics data now needs to be processed that conventional techniques are not up to the task and need to be replaced.

Fortunately, the engineers at NVIDIA Corporation in Santa Clara, Calif. have developed a new type of processing circuit that is capable of meeting these incredible demands. This amazing new circuit is based on the concept of multiple single-instruction, multiple-data processors. These new processors are capable of simultaneously executing hundreds of processes.

These new processors are so powerful that they are being put to use for other functions beyond their traditional realm of graphics processing. These functions include tasks that are normally left for a central processing unit to execute. By taking over these functions, the work load on the central processing unit is reduced, improving system performance. Alternately, this allows a slower, less-expensive central processing unit to be used.

Computations are one type of function that is now being performed by these new graphics processors. These computations may become particularly intensive when they involve lattices or matrices of data. These situations require the storage of large amounts of data. Unfortunately, memory is very expensive to include on a graphics processor. This is partly because the processing steps that are used to manufacture efficient low cost memories are not compatible with processes used for graphics processors. Accordingly, most data used by a graphics processor is stored externally. But access to an off-chip memory is slow; the latency involved in reading data may be hundreds of clock cycles. This latency reduces the computational efficiency of the graphics processor.

Thus, what is needed are circuits, methods, and apparatus that allow a graphics or other processor to perform computations involving large amounts of data while reducing the amount of data read from an external memory.

SUMMARY

Accordingly, embodiments of the present invention provide circuits, methods, and apparatus that reduce the amount of data read from an external memory by a graphics or other type of processor when performing calculations on large sets of data.

An exemplary embodiment of the present invention executes a computational algorithm on a parallel processor such as a single-instruction, multiple-data processor, which stores computational data in on-chip memories referred to as global register files and local register files. These register files may be actual registers that are arranged on an integrated circuit in a compact efficient manner. Alternately, other types of memory, such as SRAM, can be used.

In this embodiment of the present invention, a first set of data is initially read from an external memory, which may be referred to as a global memory, and stored in the global register files. A copy of a portion of the first set of data that may be useful at a later time is cached in the local register files. For example, a copy of a portion that is common to a first set and a second set of data is cached in the local register files. An algorithm is executed on the first set of data in the global registers. When complete, results are written to the external memory. To reduce the number of times results are written to the external memory, the algorithm is executed on the first set of data multiple times before results are written. The portion of the first set of data cached in the local register files can then be read and stored in the global register files, that is, the data common to the first and second sets can be transferred to the global register files. Other data that is needed for a second set of data is read from the external memory and stored in the global register files, and this data, along with the previously cached data, is processed by the algorithm, again multiple times.

In a specific embodiment of the present invention, data is processed in sections, which are further subdivided into tiles. A tile size is selected to be as large as possible given the size of the on-chip memory. To speed up processing and reduce memory bandwidth consumption, multiple iterations of an algorithm are performed on a tile before results are written back to external, memory. Additionally, data shared by sequential tiles is cached in local register files to avoid having to read it a second time, again improving computational efficiency and reducing memory bandwidth usage.

Another exemplary embodiment of the present invention provides circuits, methods, and apparatus for executing a computational algorithm on a data set that includes a matrix or lattice of data. The lattice may be too large for the calculations to be completed at one time. Accordingly, calculations are executed on portions or tiles of the lattice. Parts of tiles that can be used in later calculations are cached in local register files. While computations on one portion of the lattice are being performed, intermediate data is stored in an on-chip global register file. When complete, this data is written out to an external memory. The cached data from the local register files is read. New data is read from the external memory. This data from the shared register files and from the external memory is written to the global register files and used in the computation of a next portion of the lattice. Since different processes may read and write data from the external memory in an asynchronous manner, data is written to one range of addresses in the external memory, while data is read from a second set of addresses in the external memory.

Another exemplary embodiment of the present invention provides circuits, methods, and apparatus for executing computational algorithms to model such phenomena as electric fields or electromagnetic flow, fluid dynamics, lithographic mask design, wireless design, biomedical simulation, oil prospecting, and others. The behavior of these phenomena can be described using sets of differential equations, such as Maxwell's curl equations. These equations can in turn be modeled in the time domain using methods such as finite-difference time-domain (FDTD) techniques. FDTD performs an algorithm on a data set such as a matrix or lattice.

Again, as computations on one portion of the lattice, referred to as a tile, are being performed, intermediate data is stored in an on-chip global register file, while a copy of data in the lattice portion that can be used for later calculations is cached in local register files. To avoid writing data to memory, multiple calculations, for example multiple time steps of a time domain modeling algorithm, are executed on the data in the global register files. When calculations are complete, the global register file space needs to be cleared so it can be allocated for a use by another process to be executed. Accordingly, output data is written to the external memory. When data in an adjacent tile of the lattice is to be processed, new data is read from the external memory, while the cached data is read from the local register files. This data is written to the global register files and used in the computation for the sequentially adjacent tile.

Another exemplary embodiment of the present invention executes a number of cooperative thread arrays on a number of SIMD processors. Each CTA is responsible for computations of one swath of data in a lattice. The swath may vertically or horizontally traverse the lattice. The swaths are processed in sections referred to as tiles. For each CTA, data is read for a first tile and stored in a global register file. To save memory bandwidth, data that can be used by the CTA in processing a second, adjacent tile is stored in a local register file. An algorithm is executed on the tile, a number of iteration to again save memory bandwidth. Each iteration corresponds to what would be equivalent to one rendering pass through the SIMD. When processing is complete on the first tile, data is read out to memory. The data saved in the local register file is read. The remaining data for the second, adjacent tile is read from an external memory, and the CTA resumes processing.

Various embodiments of the present invention may incorporate one or more of these or the other features described herein. A better understanding of the nature and advantages of the present invention may be gained with reference to the following detailed description and the accompanying drawings.

DESCRIPTION OF EXEMPLARY EMBODIMENTS

Figure 1:
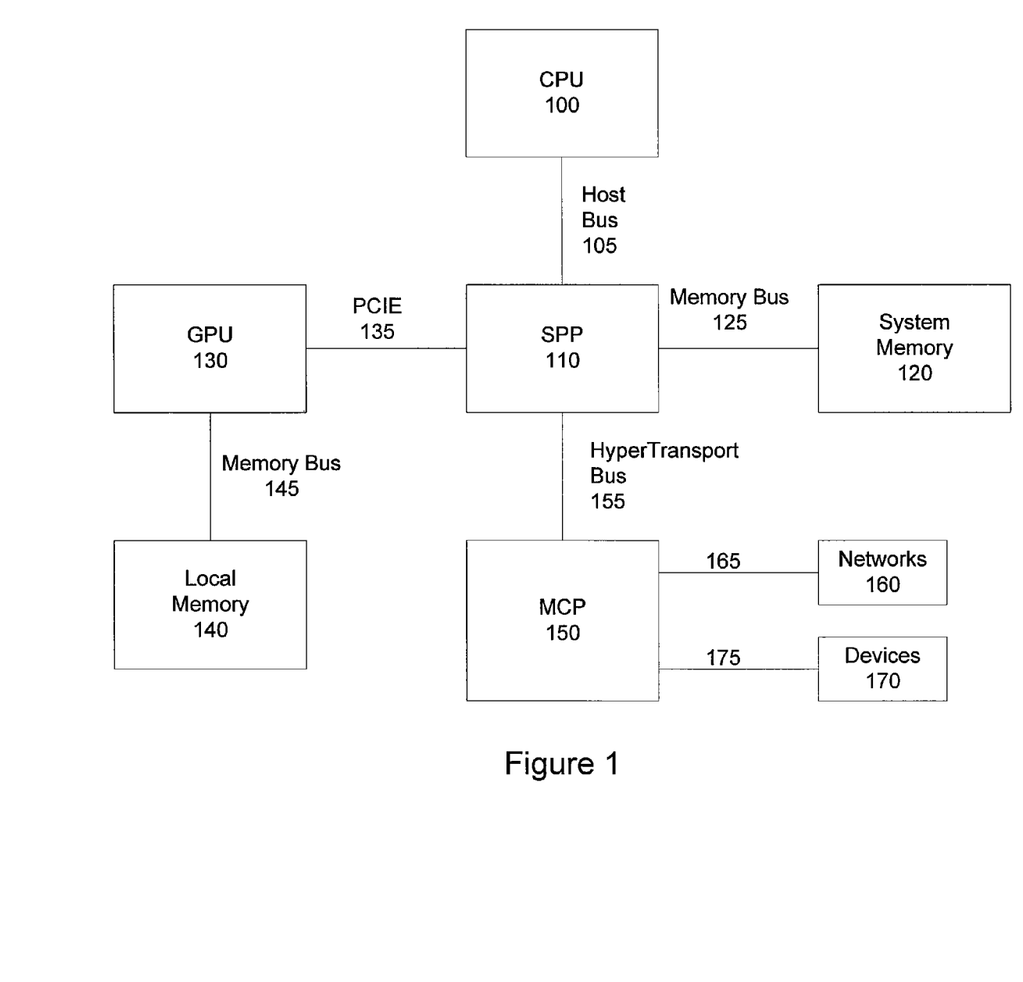
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, local memory 140, media communications processor (MCP) 150, networks 160, and internal and peripheral devices 170.

The CPU 100 connects to the SPP 110 over the host bus 105. The SPP 110 is in communication with the graphics processing unit 130 over a PCIE connection 135. The SPP 110 reads and writes data to and from the system memory 120 over the memory bus 125. The MCP 150 communicates with the SPP 110 via a high-speed connection, such as a HyperTransport bus 155, and connects network 160 and internal and peripheral devices 170 to the remainder of the computer system over lines 165 and 175. The graphics processing unit 130 receives data over the PCIE connection 135 and generates graphic and video images for display over a monitor or other display device (not shown). The graphics processing unit 130 stores fragment and other graphics data in the local memory 140 over line 145.

The CPU 100 may be a processor, such as those manufactured by Intel Corporation or other supplier, and is well-known by those skilled in the art. The SPP 110 and MCP 150 are commonly referred to as a chipset, and each is typically an integrated circuit. These may alternately be Northbridge and Southbridge devices. The system memory 120 is often a number of dynamic random access memory devices arranged in dual in-line memory modules (DIMMs). The graphics processing unit 130, SPP 110, and MCP 150 are preferably manufactured by NVIDIA Corporation.

The graphics processing unit 130 and local memory 140 may be located on a daughter board or graphics card, while the CPU 100, system platform processor 110, system memory 120, and media communications processor 150 may be located on a computer system motherboard. The graphics card is typically a printed-circuit board with the graphics processing unit 130 and local memory 140 attached. The printed-circuit board typically includes a connector, for example, a PCIE connector attached to the printed-circuit board that fits into a PCIE slot included on the motherboard.

A computer system, such as the illustrated computer system, may include more than one GPU 130. Additionally, each of these graphics processing units may be located on a separate graphics card. Two or more of these graphics cards may be joined together by a jumper or other connection. This technology, the pioneering SLI™, has been developed by NVIDIA Corporation. In other embodiments of the present invention, one or more GPUs may be located on one or more graphics cards, while one or more others are located on the motherboard.

While this embodiment provides a specific type computer system that may be improved by the incorporation of an embodiment of the present invention, other types of electronic or computer systems may also be improved. For example, video and other game systems, navigation, set-top boxes, pachinko machines, and other types of electronic systems may be improved by the incorporation of embodiments of the present invention. While embodiments of the present invention are well suited to graphics processing units, other types of graphics processors, as well as other processors, may benefit from the incorporation of an embodiment of the present invention. For example, multi or general-purpose processors, or other processors, such as integrated graphics processors or general purpose graphics processing units, may benefit from the incorporation of an embodiment of the present invention.

Also, while these types of computer systems, and the other electronic systems described herein, are presently commonplace, other types of computer and electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Figure 2:
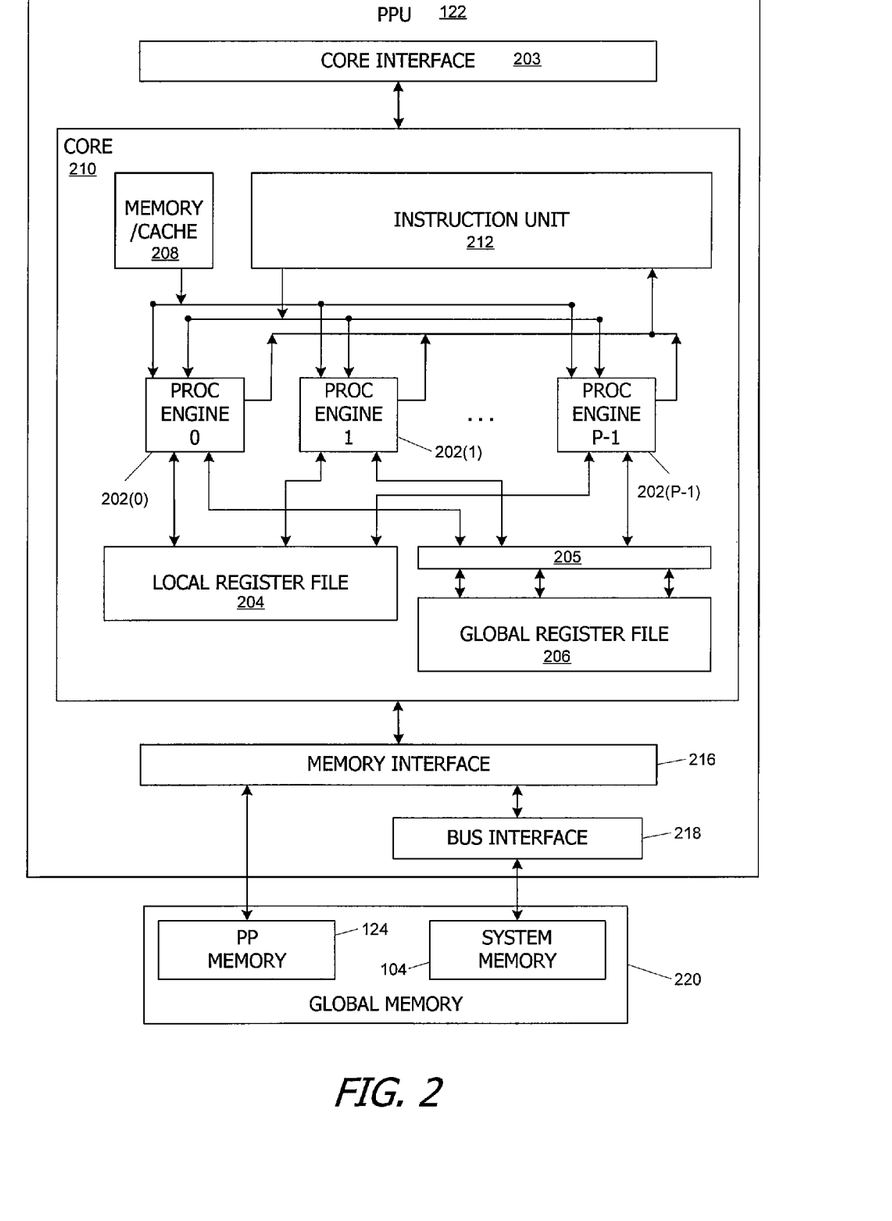
FIG. 2 is a block diagram of a parallel processing unit according to an embodiment of the present invention.

FIG. 2 is a block diagram of a parallel processing unit 122 according to an embodiment of the present invention. This parallel processing unit may be included on the graphics processing unit 130. Alternately, it may be included on other types of processing or other circuits. For example, it may be included on a general purpose graphics processing unit (GPGPU), integrated graphics processor (IGP) or other appropriate device.

PPU 122 includes a core 210 configured to execute a large number of threads in parallel, where the term "thread" refers to an instance of a particular program executing on a particular set of input data. In some embodiments, single instruction, multiple-data (SIMD) instruction issue techniques are used to support parallel execution of a large number of threads without providing multiple independent instruction fetch units.

In one embodiment, core 210 includes an array of P (e.g., 16) parallel processing engines 202 configured to receive SIMD instructions from a single instruction unit 212. Each processing engine 202 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 202 uses space in a local register file 204 for storing its local input data, intermediate results, and the like. In one embodiment, local register file 204 is physically or logically divided into P lanes, each having some number of entries (where each entry might be, e.g., a 32-bit word). One lane is assigned to each processing unit, and corresponding entries in different lanes can be populated with data for different threads executing the same program to facilitate SIMD execution. The number of entries in local register file 204 is advantageously large enough to support multiple concurrent threads per processing engine 202.

Each processing engine 202 also has access, via a crossbar switch 205, to a global register file 206 that is shared among all of the processing engines 202 in core 210. Global register file 206 may be as large as desired, and in some embodiments, any processing engine 202 can read to or write from any location in global register file 206. Global register file 206 advantageously provides a shared memory with low latency. In addition to global register file 206, some embodiments also provide additional on-chip shared memory and/or cache(s) 208, which may be implemented as a RAM or cache. On-chip memory 208 is advantageously used to hold data needed by multiple threads. Processing engines 202 also have access via a memory interface 216 to additional off-chip global memory 220, which includes, e.g., PP memory 124 and/or system memory 104, with system memory 104 being accessible by memory interface 216 via a bus interface 218; it is to be understood that any memory external to PPU 112 may be used as global memory 220. Memory interface 216 and bus interface 218 may be of generally conventional design, and other appropriate interfaces may be substituted. Processing engines 202 are advantageously coupled to memory interface 216 via an interconnect (not explicitly shown) that allows any processing engine 202 to access global memory 220.

In one embodiment, each processing engine 202 is multi-threaded and can execute up to some number G (e.g., 24) of threads concurrently, e.g., by maintaining current state information associated with each thread in a different portion of its assigned lane in local register file 204. Processing engines 202 are advantageously designed to switch rapidly from one thread to another so that instructions from different threads can be issued in any sequence without loss of efficiency.

Instruction unit 212 is configured such that, for any given processing cycle, the same instruction is issued to all P processing engines 202. Thus, at the level of a single clock cycle, core 210 implements P-way SIMD microarchitecture. Since each processing engine 202 is also multithreaded, supporting up to G threads, core 210 in this embodiment can have up to P*G threads executing concurrently. For instance, if P=16 and G=24, then core 210 supports up to 384 concurrent threads.

Because instruction unit 212 issues the same instruction to all P processing engines 202 in parallel, core 210 is advantageously used to process threads in "SIMD groups." As used herein, a "SIMD group" refers to a group of up to P threads of execution of the same program on different input data, with one thread of the group being assigned to each processing engine 202. (A SIMD group may include fewer than P threads, in which case some of processing engines 202 will be idle during cycles when that SIMD group is being processed.) Since each processing engine 202 can support up to G threads, it follows that up to G SIMD groups can be executing in core 210 at any given time.

On each clock cycle, one instruction is issued to all P threads making up a selected one of the G SIMD groups. To indicate which thread is currently active, a "group index" (GID) for the associated thread group may be included with the instruction. Processing engine 202 uses group index OD as a context identifier, e.g., to determine which portion of its allocated lane in local register file 204 should be used when executing the instruction. Thus, in a given cycle, all processing engines 202 in core 210 are nominally executing the same instruction for different threads in the same group. (In some instances, some threads in a group may be temporarily idle, e.g., due to conditional or predicated instructions, divergence at branches in the program, or the like.)

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 210 is shown, a PPU 122 may include any number of cores 210, with appropriate work distribution logic to distribute incoming processing tasks among the available cores 210, further increasing the processing capacity.

In accordance with an embodiment of the present invention, multithreaded processing core 210 of FIG. 2 can execute general-purpose computations using cooperative thread arrays (CTAs). As used herein, a "CTA" is a group of multiple threads that concurrently execute the same program on an input data set to produce an output data set. Each thread in the CTA is assigned a unique thread identifier ("thread ID") that is accessible to the thread during its execution. The thread ID controls various aspects of the thread's processing behavior. For instance, a thread ID may be used to determine which portion of the input data set a thread is to process, to identify one or more other threads with which a given thread is to share an intermediate result, and/or to determine which portion of an output data set a thread is to produce or write.

CTAs are advantageously employed to perform computations that lend themselves to a data parallel decomposition, i.e., application of the same processing algorithm to different portions of an input data set in order to effect a transformation of the input data set to an output data set. The processing algorithm is specified in a "CTA program," and each thread in a CTA executes the same CTA program on a different subset of an input data set. A CTA program can implement algorithms using a wide range of mathematical and logical operations, and the program can include conditional or branching execution paths and direct and/or indirect memory access.

Threads in a CTA can share intermediate results with other threads in the same CTA using a shared memory (e.g., global register file 206) that is accessible to all of the threads, an interconnection network, or other technologies for inter-thread communication, including technologies known in the art. In some embodiments, a CTA program includes an instruction to compute an address in shared memory to which particular data is to be written, with the address being a function of thread ID. Each thread computes the function using its own thread ID and writes to the corresponding location. The address function is advantageously defined such that different threads write to different locations; as long as the function is deterministic, the location written to by any thread is well-defined. The CTA program can also include an instruction to compute an address in shared memory from which data is to be read, with the address being a function of thread ID. By defining suitable functions and providing synchronization techniques, data can be written to a given location by one thread and read from that location by a different thread in a predicable manner. Consequently, any desired pattern of data sharing among threads can be supported, and any thread in a CTA can share data with any other thread in the same CTA.

Since all threads in a CTA execute the same program, any thread can be assigned any thread ID, as long as each valid thread ID is assigned to only one thread. In one embodiment, thread IDs are assigned sequentially to threads as they are launched. It should be noted that as long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In one embodiment, if a CTA includes some number (7) of threads, thread IDs are simply sequential (one-dimensional) index values from 0 to T−1. In other embodiments, multidimensional indexing schemes may be used.

In addition to thread IDs, some embodiments also provide a CTA identifier that is common to all threads in the CTA. CTA identifiers can be helpful, e.g., where an input data set is to be processed using multiple CTAs that process different (possibly overlapping) portions of an input data set. The CTA identifier may be stored in a local register of each thread, in a state register accessible to all threads of the CTA, or in other storage accessible to the threads of the CTA.

While all threads within a CTA are executed concurrently, there is no requirement that different CTAs are executed concurrently, and the hardware need not support sharing of data between threads in different CTAs.

It will be appreciated that the size (number of threads) of a CTA and number of CTAs required for a particular application will depend on the application. Thus, the size of the CTA, as well as the number of CTA to be executed, are advantageously defined by a programmer or driver program and provided to core 210 and core interface 203 as state parameters.

Figure 3:
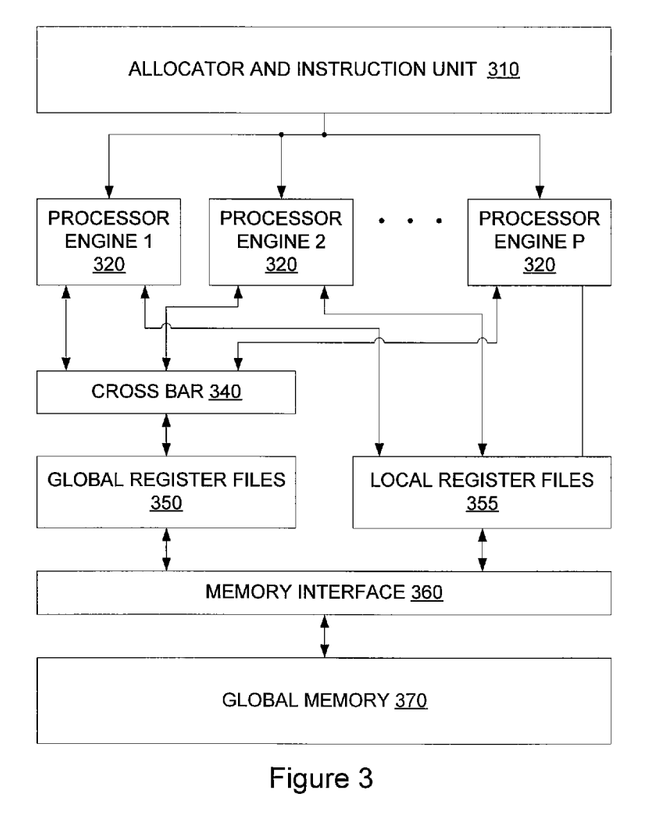
FIG. 3 is a simplified block diagram of a parallel processing unit consistent with an embodiment of the present invention.

FIG. 3 is a block diagram of a parallel processing unit consistent with an embodiment of the present invention. This figure includes an allocator and instruction unit 310, a number of processor engines 320, crossbar 340, global register files 350, local register files 355, and memory interface 360, and global memory 370.

The allocator and instruction unit 310 dispatches instructions to the processor engines 320. As described above, each processor engine 320 is capable of simultaneously processing several threads, each of which includes one or more instructions. During each clock cycle, the instruction unit 310 can dispatch an instruction for one thread executing in each processor engine 320. In this way, these threads form a P-wide thread group. One or more of these thread groups may be referred to as cooperative thread array.

The processor engines 320 execute instructions on data stored in the global register files 350, local register files 355, and other locations. Each processor engine 320 has access to each of the global register files 350 via the crossbar 340. In this way, threads operating on one processor engine 320 can share or retrieve intermediate or final computational results with threads executing on the other processor engines 320. Each processor engine 320 also has access to a number of registers in the local register files 350. Data in the global register files 350 and other locations can be stored in an external memory, the global memory 370, via the memory interface 360. The memory interface 360 stores data in, and retrieves data from, the global memory 370, and provides clocks, refresh, and other overhead signals for the global memory 370. The processor engines 320 can also store data in, and retrieve data from, the memory cache 330.

Again, the memory cache 330, global register files 350, and local register files 355, are formed on an integrated circuit that also includes the instruction unit 310, processor engines 320, crossbar 340, and memory interface 360, and other circuitry. The global memory 370 is typically not included on this chip. Presently this because the global memory 370 is most efficiently manufactured using one of a number of highly specialized processes developed for this purpose. The other circuits, such as the processor engines 320 and global register files 350, are manufactured using another type of process that is incompatible with the process used to manufacture the global memory 370. Therefore, these circuits are most efficiently manufactured using different process than that used for the global memory 370. This different processing leads to the circuitry of this figure being on two different integrated circuits. In the future, some or all of the global memory 370 may be included on an integrated circuit with the processor engines 320 global register files 350 in a manner consistent with embodiment of the present invention. When this occurs, other circuits, such as the central processing unit 100 will likely need to be able to access this on chip global memory.

Since the global memory 370 is on a separate device, when data in the global memory 370 is needed by a processor engine 320, a request for the data is made by the memory interface 360. The memory interface 360 typically reads and writes data for other clients, which are other circuits on the processor, as well. Because of this, a read request by the parallel processing unit may be delayed behind other requests. Also, data retrieval from an external memory such as the global memory 370 is much slower than data retrieval from on-chip memory such as the global register files 350. This leads to comparatively long delays, referred to as latency delays, when data is read from the global memory 370. For this reason, it is desirable for a thread array to store data on chip in the global register files 350 while it is being executed.

After a thread group, or cooperative thread array, has been executed, the thread array's space in the global register files needs to be freed up so it can be allocated for use by subsequent thread arrays. At this time, data stored by the threads in global register files 350 can be written out to the global memory 370 via the memory interface 360.

In computations where some or all or the data read from the memory 370 for a CTA will also be needed by the CTA at a later time, it is desirable to maintain this data, the "reusable" data, on chip, thereby avoiding the latency delay incurred by reading the data a second time from the global memory 370.

Accordingly, embodiments of the present invention reduce memory bandwidth usage by caching data read from an external memory for a CTA that can also be used later by the CTA in an on-chip memory. Also, embodiments of the present invention execute an algorithm on data read from the external memory multiple times before writing results to the external memory. An example of such a procedure is shown in the following series of figures.

Figure 4A:
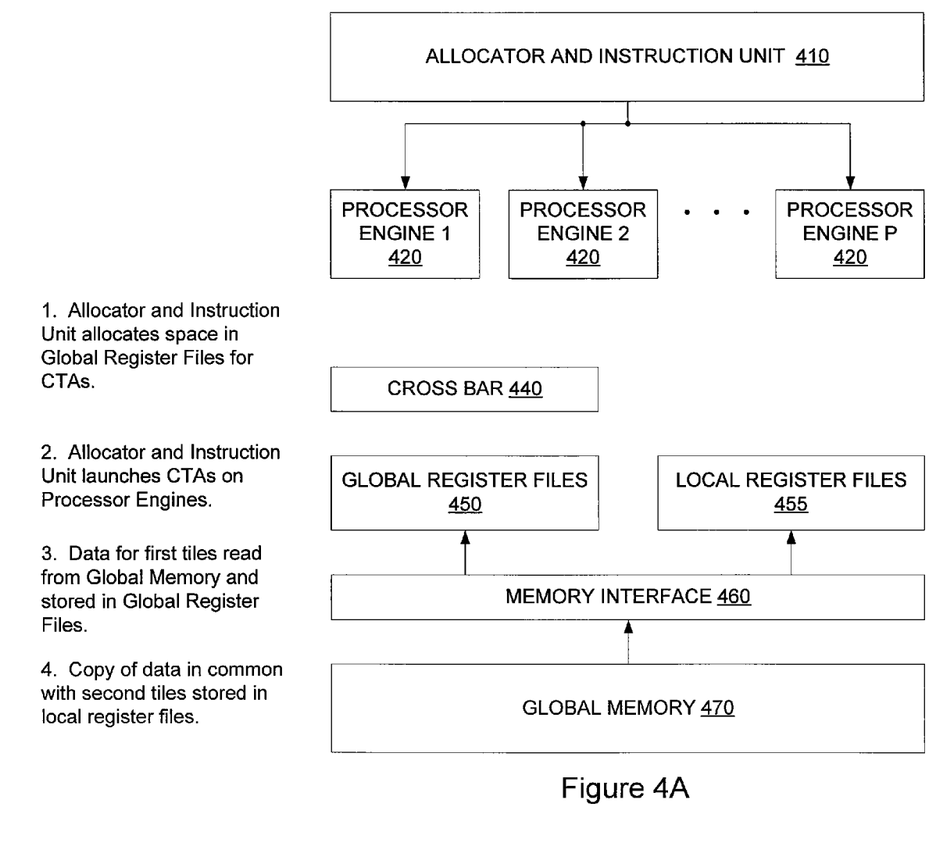
FIGS. 4A-4C illustrate the transfer of data in a parallel processing unit according to an embodiment of the present invention.
Figure 4B:
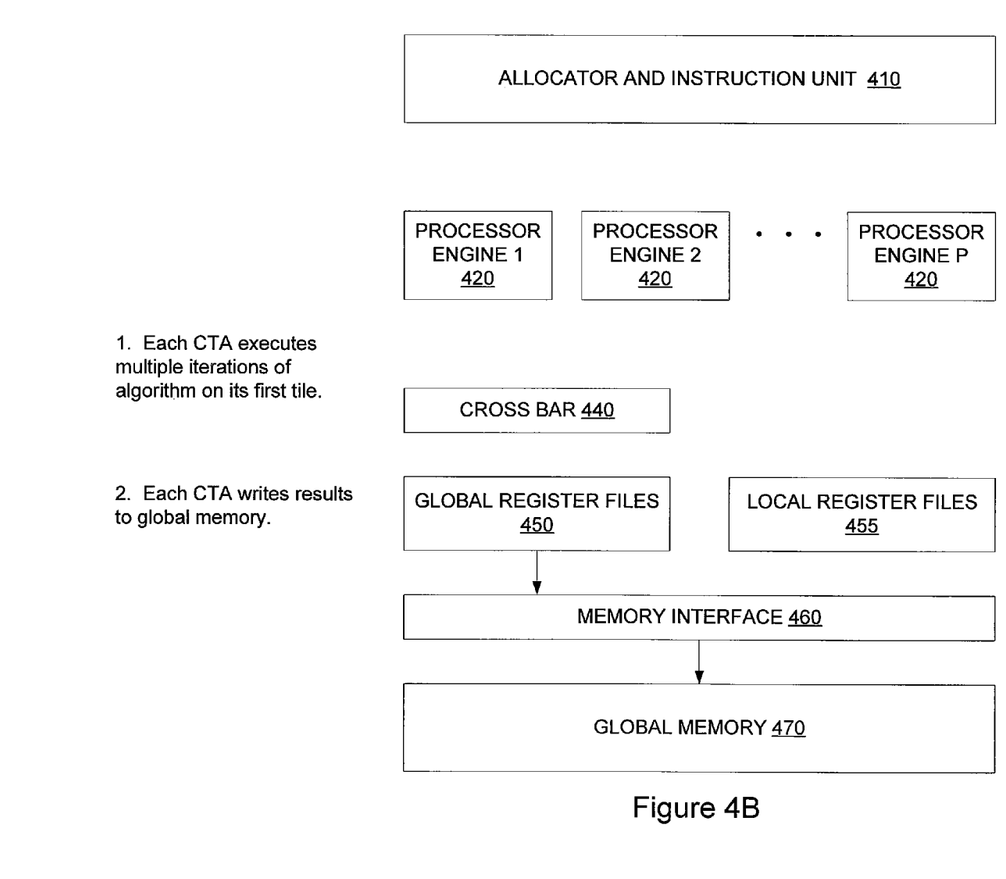
Figure 4C:
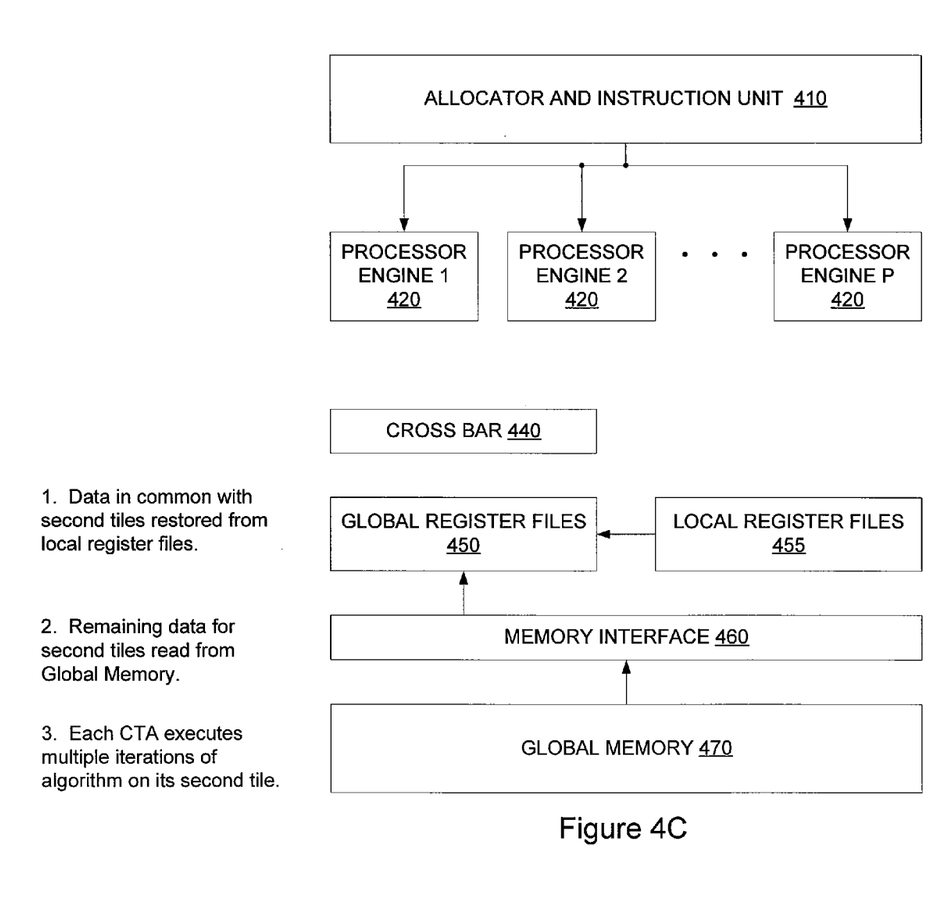

FIGS. 4A-4C illustrate the transfer of data in a parallel processing unit according to an embodiment of the present invention. In this method, a cooperative thread array executing on a number of processor engines stores data in the global register files 450. Intermediate and final data stored the global register files 450 can be used by the various threads in a CTA. Data that can be used again by the CTA is stored in the local register files 455. When a thread group completes execution, its data is written out to an external memory. A flowchart illustrating the above acts is shown in the following figure.

These figures include an allocator and instruction unit 410, processor engines 420, crossbar 440, global register files 450, local register files 455, memory interface 460, and global memory 470. In FIG. 4A, an allocator and instruction unit 410 allocates space in global register files 450 for a number of cooperative thread arrays. The allocator and instruction unit 410 then launches the cooperative thread arrays on the processor engines 420. The data in the first tiles to be processed by their respective cooperative thread arrays is read from the global memory 470 and stored in the allocated space in the global register files 450. A copy of that part of this data that can be subsequently used by the cooperative thread arrays is stored in the local register files 450. Specifically, a copy of the data that is in common between the first tiles, second and subsequent tiles for each CTA is written to the local register files 455.

In FIG. 4B, each CTA executes an algorithm on the first tile stored in the global register files 450 a number of times. When complete, results are written to the global memory 470.

In FIG. 4C, data stored in the local register files 455 is transferred to the global register files 450. New data needed for the second tiles to be processed by the CTAs is read from the global memory 470, and stored in the global register files 450. This process can continue until each tile, of which there may be one, two, three, or any number, in the swath is processed. A flowchart illustrating this is shown in the following figure.

In this example, each CTA operates on a horizontal or vertical swath off the lattice using a single instruction multiple data processor. Each swath is subdivided into a series of sequentially adjacent tiles, which may or may not share data required for the calculation of the final result. During the execution of a CTA, a full tile is read from the global memory. Data shared between this tile and a next sequentially adjacent tile is stored in the local register files of the processor. Several iterations of the underlying algorithm is performed. When the calculations for this tile are complete, the results are written back to external memory, and data for the next tile is read. Since the CTA cached data read for the previous tile that was needed by the next sequentially adjacent tile, bandwidth from external memory is reduced, since this data can be recycled instead of having to be read from the external memory.

Figure 5:
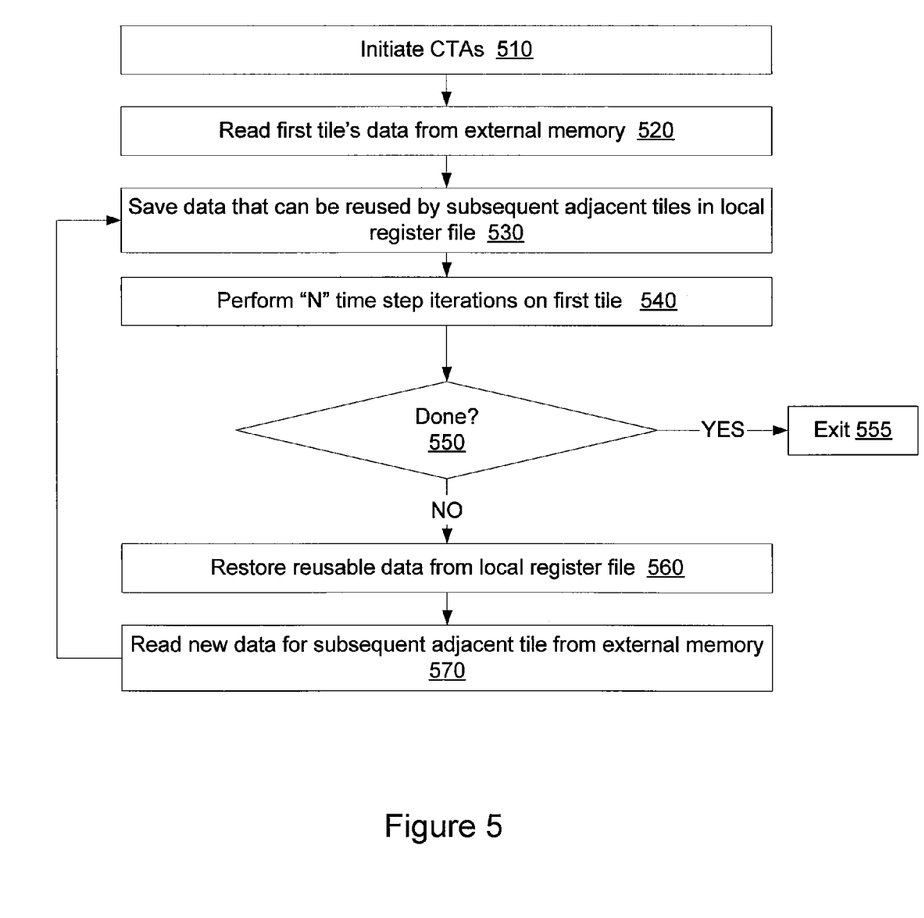
FIG. 5 illustrates a method of executing an algorithm on a lattice or other data set according to an embodiment of the present invention.

FIG. 5 illustrates a method of executing and algorithm on a lattice or other data set according to an embodiment of the present invention. In act 510, space is allocated in a global register file for a cooperative thread array, and the cooperative of thread array is launched. In act 520, a first tile to be processed by the cooperative thread array is read. In act 530, a copy of data that can be reused by the CTA in processing a second subsequent adjacent tile is stored in a local register file. An algorithm is executed a number of times on the first tile in act 540. In act 550, it is determined whether the algorithm is complete. If it is, the process exits in act 555. If not, the reusable data is restored from the local register file to the global register files in act 560. New data for the subsequent adjacent tile is read in act 570. As before, data that can be used by a third subsequent adjacent tile is stored in the local register files in act 530, and the processing by the CTA continues.

One type of data set on which computations may be executed using the above methods includes matrices and lattices. A matrix or lattice includes a number of entries, where each entry may include one or more data items. An algorithm may be executed on a matrix by assigning one or more threads to one or more entries in the lattice. For example, one thread may be assigned to each entry, two threads may be assigned to an entry in the lattice, or one thread may be assigned to two entries in the lattice. Also, other variations are possible. A cooperative thread array may execute an algorithm on a subset of entries in the lattice, such that multiple cooperative thread arrays are used to complete the computation for an entire lattice. An example of this is shown in the following sequence of figures.

Figure 6A:
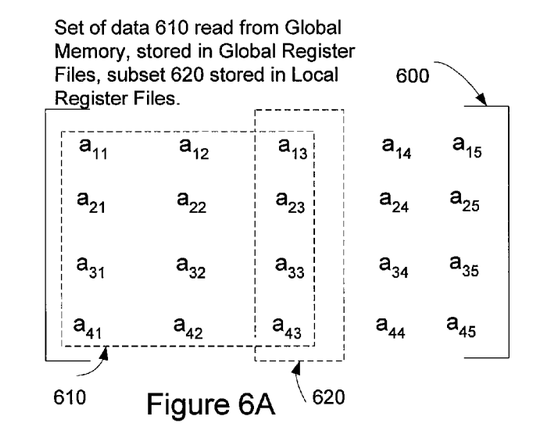
FIGS. 6A-6D illustrate a method of executing an algorithm on a lattice of data according to an embodiment of the present invention.

FIGS. 6A-6D illustrate a method of executing an algorithm on a lattice of data according to an embodiment of the present invention. In FIG. 6A, a first set of data 610, which may be one swath in a larger array or matrix, in an array 600 is read from a global memory and stored in a global register file. A copy of a portion 620 of the first set of data that is common with a second set of data is stored in local register files. The array 610 is processed multiple times using a single instruction multiple data processor.

Figure 6B:
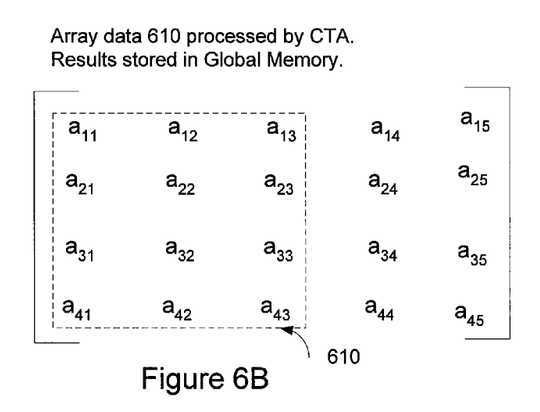
Figure 6C:
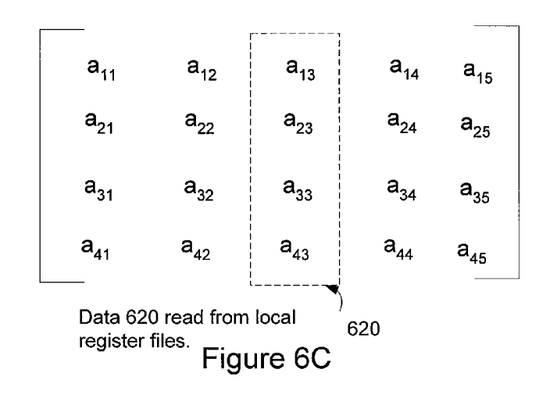
Figure 6D:
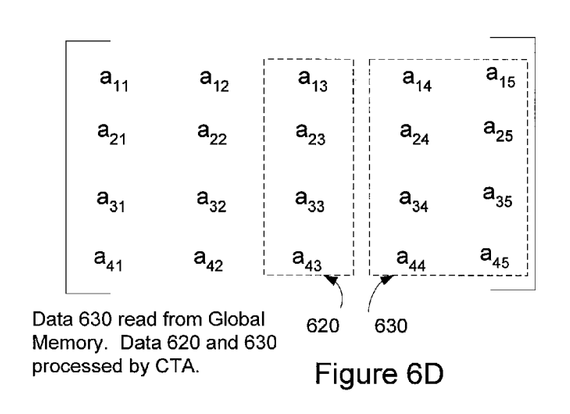

In FIG. 6B, execution of the algorithm on part of the lattice is complete, so the data is stored in the global memory. In FIG. 6C, data 620, which is data that can be reused by the cooperative thread array, is read from the local register files. In FIG. 6D, data 630 is read from the global memory. The second set of data, data 620 and 630, can then be processed by the cooperative thread array.

Various physical, electrical, magnetic, and other phenomena can be described using differential equations, such as Maxwell's curl equations:

$$\frac{\partial E_z}{\partial t} = \frac{1}{\varepsilon}\frac{\partial H_y}{\partial x} - \frac{\partial H_x}{\partial y}$$

$$\frac{\partial H_x}{\partial t} = \frac{-1}{\mu}\frac{\partial E_z}{\partial y}$$

$$\frac{\partial H_y}{\partial t} = \frac{1}{\mu}\frac{\partial E_z}{\partial x}$$

These differential equations can be solved in the time domain using, for example, finite-difference time-domain techniques. As its name implies, this technique models the differential equations in the time domain. In this way, the phenomena such as electric fields or electromagnetic flow, fluid dynamics, lithographic mask design, wireless design, biomedical simulation, oil prospecting, and others, can be modeled. The equations that can be used to model the time domain behavior of the above differential equations are executed as two individual functions, where each function is executed in one pass through a parallel processor. In the first function, values of $E_z$ in each cell of the lattice are updated using a current value of $E_z$ and the values of $H_x$ and $H_y$ in two vertically and horizontally neighboring cells or entries with the following equation:

$$E_z^{t+1} = \frac{1}{2}((H_y^{0,0} - H_y^{0,-1}) + (H_x^{-1,0} - H_x^{0,0}))$$

where the superscripts in the H values indicate relative lattice coordinates in two dimensions. In the second phase of the timestep calculation, the H values are similarly updated:

$$H_x^{t+1} = \frac{1}{2}E_z^{0,0} - E_z^{1,0}$$

$$H_y^{t+1} = \frac{1}{2}E_z^{0,1} - E_z^{0,0}$$

If H and E are included in entries in a lattice, the lattice can be solved for each entry, for one time step using data in each entry and its adjacent entries. Two-time steps can be solved using data in each entry, along with data in entries that are within two lattice entries. More generally, k time steps can be executed for an entry using data in that entry and entries within k lattice entries. An example of this is shown in the following figure.

Figure 7:
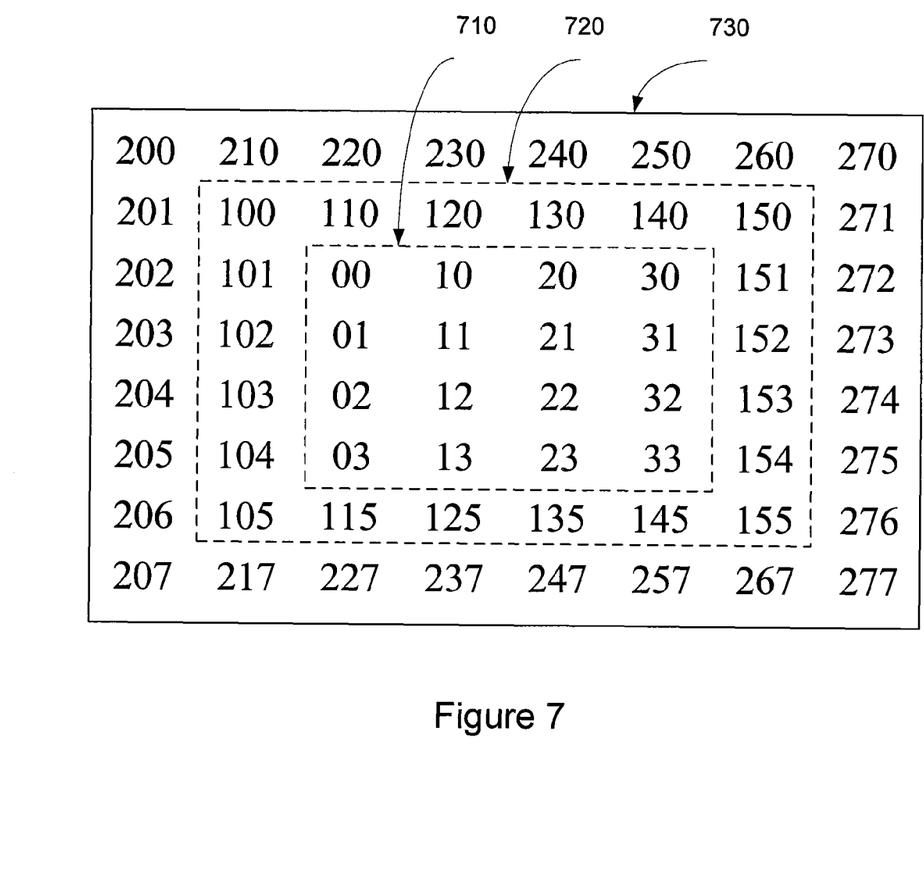
FIG. 7 illustrates a lattice of data on which an algorithm may be executed using a method according to an embodiment of the present invention.

FIG. 7 illustrates a lattice of data on which an algorithm may be executed using a method according to an embodiment of the present invention. Entries in data set 710 are the entries on which the above finite domain finite time algorithm is to be executed. Data set 710 may be referred to as a tile. In this example, the tile is of size (m×m) where m is equal to 4, though in other exemplary embodiments of the present invention, the tile may be of a size (m×n), where m and n have different values from each other, and have values that may be different than four. In order to execute one timestep on tile 710, data set 720 is needed. In order to execute two-time steps on tile 710, data set 730 is needed. For the general case of k time steps, and a tile of (m×n) entries, a data set having (m+2k)(n+2k) entries is needed.

For example, to execute the algorithm for one time step on entry 00, data in entries 110, 10, 01, and 101 are needed along with the data in entry 00. To execute the algorithm for two time steps for entry 00, data entries 220, 110, 10, 20, 01, 02, 101, and 202 are needed along with the data in entry 00.

Figure 8:
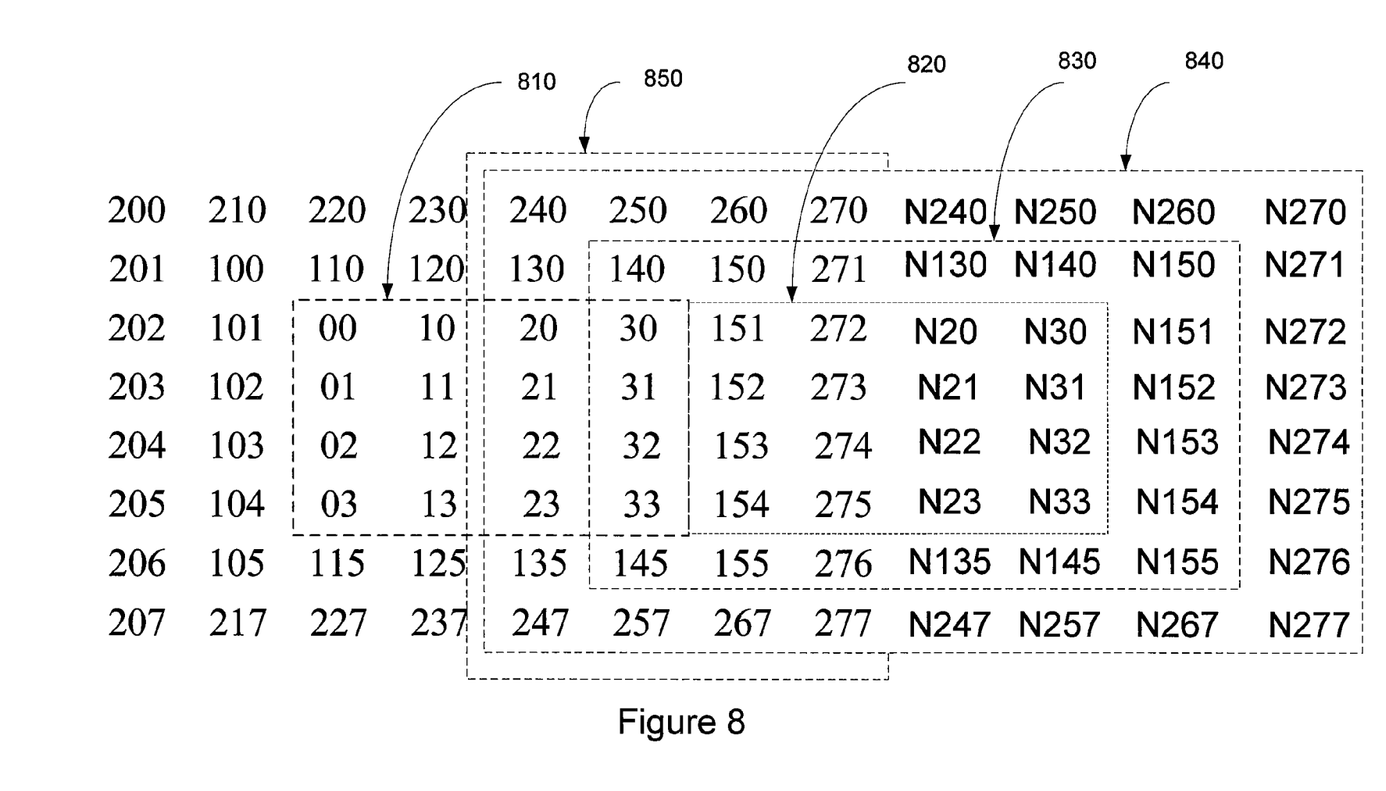
FIG. 8 illustrates adjacent tiles in a lattice of data being processed according to an embodiment of the present invention.

FIG. 8 illustrates adjacent tiles in a lattice of data being processed according to an embodiment of the present invention. In this example, tile 820 is adjacent to tile 810. Again, to execute one time step on the tile 820, data set 830 is required. To execute two time steps on the tile 820, data set 840 is required. In this example, tile 810 can be processed by a cooperative thread array, while tile 820 is subsequently processed by the cooperative thread array. After tile 810 is processed by the cooperative thread array, the resulting data is written out to memory. Data set 850, a subset of data set 840, is needed to process two time steps on tile 820. Accordingly, a copy of data set 850 is maintained on chip for later use by the cooperative thread array. The remainder of data set 840 is read from memory, and the cooperative thread array then processes tile 820 using data set 840. A flowchart of this is shown in the following figure.

Figure 9:
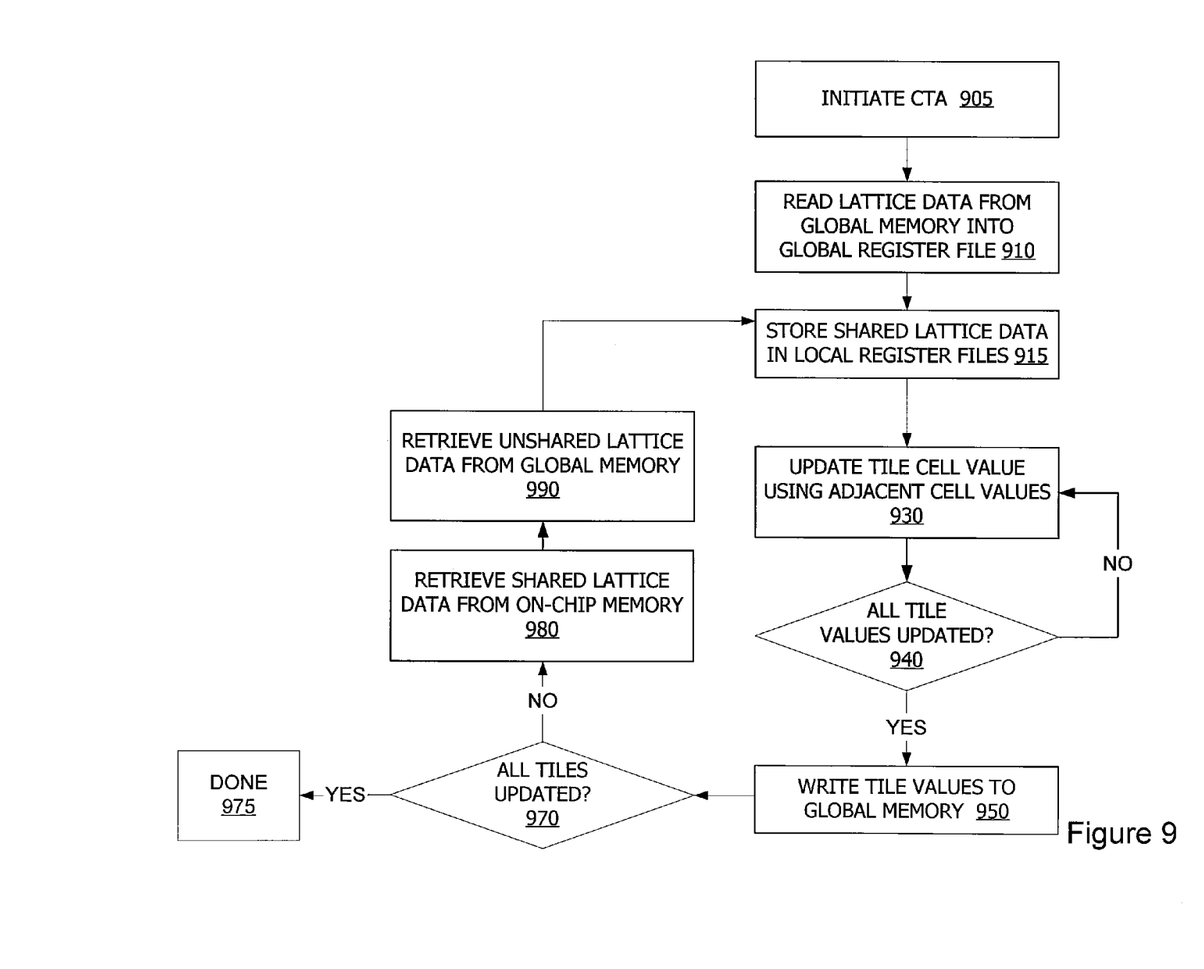
FIG. 9 illustrates a method of executing a computational algorithm on a lattice of data according to an embodiment of the present invention.

FIG. 9 illustrates a method of executing a computational algorithm on a lattice of data according to an embodiment of the present invention. In act 905, one or more CTAs are initiated. In act 910, lattice data for a first tile is read from a global memory into a global register file. Lattice data that is common to the first tile and a second subsequent adjacent tile is stored in local register files in act 915. Lattice entries in the tile, or cell values, are updated using adjacent cells values in act 930. Again, this may be performed a number of times.

In act 940, it is determined whether all the tile values are updated. If not, the updating continues in act 930. When complete, the tile values are written out to the global memory in act 950. In act 970, it is determined whether all tiles in the lattice have been updated. If not, then shared lattice data is retrieved in act 980, and unshared lattice data is retrieved from the global memory in act 990. In act 915, a part of the new data that is common to a third subsequent tile adjacent to the second tile is stored in the local register files. If it is determined in act 970 that all tiles in the lattice have been updated, then processing is complete in act 975. Processing for subsequent time steps may proceed if desired.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of executing an algorithm on a set of data comprising:
    reading an (m+2k) by (n+2k) array of data of the set of data from an external memory;
    storing the (m+2k) by (n+2k) array of data in a first on-chip memory;
    storing a (2k) by (n+2k) array portion of the (m+2k) by (n+2k) array of data in a second on-chip memory;
    executing k time steps of a time domain modeling algorithm on a first (m) by (n) array of data in the (m+2k) by (n+2k) array of data to generate a set of results;
    storing the set of results in the external memory;
    reading the (2k) by (n+2k) array portion of the (m+2k) by (n+2k) array of data from the second on-chip memory;
    storing the (2k) by (n+2k) array portion of the first subset of data in the first on-chip memory;
    reading an (m) by (n+2k) array of the set of data from the external memory;
    storing the (m) by (n+2k) array of data in the first on-chip memory; and
    executing k time steps of the time domain modeling algorithm on a second (m) by (n) array of data in the (2k) by (n+2k) array portion of the (m+2k) by (n+2k) array of data and the (m) by (n+2k) array of data,
    wherein the first (m) by (n) array of data and the second (m) by (n) array of data are contiguous arrays of data.

2. The method of claim 1 wherein the (m+2k) by (n+2k) array of data comprises a portion of a lattice.

3. The method of claim 2 wherein the lattice is a data structure for modeling Maxwell's curl equations.

4. The method of claim 1 wherein storing the (m+2k) by (n+2k) array of data in the first on-chip memory comprises:
storing the (m+2k) by (n+2k) array of data in an on-chip global register file.

5. The method of claim 1 wherein the k time steps of a time domain modeling algorithm is executed on a plurality of parallel single-instruction, multiple data processors.

6. The method of claim 5 wherein the time domain modeling algorithm is an instruction in a finite-difference time-domain algorithm.

7. The method of claim 1 wherein the k time steps of a time domain modeling algorithm is included in a first cooperative thread array.

8. An integrated circuit comprising:
a plurality of processors;
a first memory coupled to store an (m+2k) by (n+2k) array of data of a set of data then to store a (2k) by (n+2k) array portion of the (m+2k) by (n+2k) array of data and a (m) by (n+2k) array of the set of data for the plurality of processors and results generated by the plurality of processors, and to transfer the results;
a second memory coupled to store the (2k) by (n+2k) array portion of the (m+2k) by (n+2k) array of data for the plurality of processors, and then to transfer the (2k) by (n+2k) array portion of the (m+2k) by (n+2k) array of data to the first memory;
a memory interface coupled to write the results stored in the first memory to an external memory, to read the (m+2k) by (n+2k) array and the (m) by (n+2k) array of data from the external memory, and to store data read from the external memory in the first memory and the second memory; and
an instruction unit coupled to issue instructions to execute a time domain modeling algorithm on a first (m) by (n) array of data in the (m+2k) by (n+2k) array of data and a second (m) by (n) array of data in the (2k) by (n+2k) array portion of the (m+2k) by (n+2k) array of data and the (m) by (n+2k) array of data to the plurality of processors and to allocate locations in the first memory, where k is a number of time steps of the time domain modeling algorithm to be executed, and where the first (m) by (n) array of data and the second (m) by (n) array of data are contiguous arrays of data.

9. The integrated circuit of claim 8 wherein before the instruction unit allocates locations in the first memory, results stored in the first memory are written to the external memory by the memory interface.

10. The integrated circuit of claim 9 wherein after the instruction unit allocates locations in the first memory, at least some of the data stored in the second memory is transferred to the first memory, and data is read from the external memory and stored in the first memory.

11. The integrated circuit of claim 8 wherein each of the plurality of processors comprises a plurality of single-instruction, multiple-data processors.

12. The integrated circuit of claim 8 wherein the first memory is a global register file.

13. The integrated circuit of claim 12 wherein the global register file comprises a plurality of registers.

14. The integrated circuit of claim 8 wherein the integrated circuit comprises a graphics processor.

15. The integrated circuit of claim 8 wherein the data stored in the external memory comprises a lattice used to model a set of differential equations.

16. A method of executing a computational algorithm on a lattice of data comprising:
reading an (m+2k) by (n+2k) array of the lattice from an external memory using a memory interface, storing the (m+2k) by (n+2k) array of the lattice in a first memory, and storing a (2k) by (n+2k) array portion of the (m+2k) by (n+2k) array of the lattice in a second memory;
executing a first plurality of threads corresponding to k time steps of a time domain modeling algorithm on a first (m) by (n) array of data in the (m+2k) by (n+2k) array of the lattice to generate a set of results;
storing the set of results in the first memory;
storing the set of results in the first memory in the external memory;
transferring the (2k) by (n+2k) array portion of the (m+2k) by (n+2k) array of the lattice from the second memory to the first memory;
reading a (m) by (n+2k) array of the lattice from the external memory, storing the (m) by (n+2k) array of the lattice in the first memory, and storing a (2k) by (n+2k) array portion of the (m) by (n+2k) array of the lattice in the second memory; and
executing the first plurality of threads corresponding to k time steps of the time domain modeling algorithm on a second (m) by (n) array of data in the (m) by (n+2k) array of the lattice and the (2k) by (n+2k) array portion of the (m+2k) by (n+2k) array of the lattice stored in the first memory,
wherein the first (m) by (n) array of data and the second (m) by (n) array of data are contiguous arrays of data.

17. The method of claim 16 wherein the first plurality of threads comprises a cooperative thread array.

18. The method of claim 17 wherein the cooperative thread array is executed on a plurality of single-instruction, multiple-data processors.

19. The method of claim 16 wherein the first memory is a global register file.

20. The method of claim 19 wherein the first memory is included on a graphics processor.

* * * * *